United States Patent
Hong et al.

(10) Patent No.: US 12,418,790 B2
(45) Date of Patent: Sep. 16, 2025

(54) INFORMATION REPORTING METHOD AND APPARATUS, AND STORAGE MEDIUM

(71) Applicant: BEIJING XIAOMI MOBILE SOFTWARE CO., LTD., Beijing (CN)

(72) Inventors: Wei Hong, Beijing (CN); Guilong Yao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 361 days.

(21) Appl. No.: 18/250,063

(22) PCT Filed: Oct. 23, 2020

(86) PCT No.: PCT/CN2020/123413
§ 371 (c)(1),
(2) Date: Apr. 21, 2023

(87) PCT Pub. No.: WO2022/082778
PCT Pub. Date: Apr. 28, 2022

(65) Prior Publication Data
US 2024/0015500 A1    Jan. 11, 2024

(51) Int. Cl.
*H04W 8/24* (2009.01)
*H04W 88/06* (2009.01)

(52) U.S. Cl.
CPC .............. *H04W 8/24* (2013.01); *H04W 88/06* (2013.01)

(58) Field of Classification Search
CPC ....... H04W 88/06; H04W 8/24; H04W 76/15; H04W 76/27; H04W 48/18; H04W 60/005; H04W 8/183
See application file for complete search history.

(56) References Cited

U.S. PATENT DOCUMENTS

2015/0282057 A1   10/2015   Li et al.
2018/0146365 A1*  5/2018   Dhanapal .............. H04W 8/183
(Continued)

FOREIGN PATENT DOCUMENTS

CN    110622612 A    12/2019
CN    111263458 A    6/2020
(Continued)

OTHER PUBLICATIONS

Combined Chinese Office Action and Search Report issued Apr. 29, 2023 in Patent Application No. 202080002824.6 (with English translation of Category of Cited Documents), 11 pages.
(Continued)

*Primary Examiner* — Anthony S Addy
(74) *Attorney, Agent, or Firm* — Oblon, McClelland, Maier &Neustadt, L.L.P.

(57) ABSTRACT

An information reporting method includes reporting capability information, which is used for indicating a target terminal capability, to a base station, wherein the target terminal capability is used for indicating the capability of a multi-card terminal to support a plurality of SIM cards operating at the same time. A base station configures target configuration information for a multi-card terminal when the multi-card terminal does not have a target terminal capability, so that the multi-card terminal can report SIM card information of a plurality of SIM cards when the multi-card terminal does not support the target terminal capability.

10 Claims, 6 Drawing Sheets

(56) References Cited

U.S. PATENT DOCUMENTS

2022/0361133 A1* 11/2022 Shaheen ................. H04W 8/20
2022/0408518 A1* 12/2022 Bergström ............. H04W 8/24
2023/0254918 A1*  8/2023 Gurumoorthy ......... H04W 8/24
                                                        455/435.1

FOREIGN PATENT DOCUMENTS

| CN | 111278002 A | 6/2020 |
|----|-------------|--------|
| CN | 111512657 A | 8/2020 |
| CN | 112469032 A | 3/2021 |
| WO | WO 2019/125508 A1 | 6/2019 |

OTHER PUBLICATIONS

Vivo, "Report of phase 1 Multi-SIM email discussion," 3GPP TSG-RAN WG Meeting #85 RP-191898, Sep. 2019, 36 pages.

Samsung, "Overview on SA2 progress for Multi-USIM devices," 3GPP TSG-RAN WG2 Meeting #111-e R2-2008021, Aug. 2020, 4 pages.

3GPP TSG-RAN WG2 #112e R2-2008832, "*Support of UE capabilities coordination for Dual Tx/Dual Rx Multi-USIM UEs*", China Telecom, Oct. 2020, 4 pages.

International Search Report with English translation mailed on Jul. 22, 2021 in PCT/CN2020/123413 filed on Oct. 23, 2020 (4 pages).

\* cited by examiner

INFORMATION REPORTING METHOD AND APPARATUS, AND STORAGE MEDIUM

CROSS-REFERENCE TO RELATED APPLICATIONS

The present application is a U.S. National Stage of International Application No. PCT/CN2020/123413, filed on Oct. 23, 2020, the contents of all of which are incorporated herein by reference in their entireties for all purposes.

TECHNICAL FIELD

The present disclosure relates to the field of communications and in particular to an information reporting method and apparatus, and storage medium.

BACKGROUND

With the development of wireless communication technology, multi-card terminals are becoming more and more common. Take a dual-card terminal as an example, a business user has a private SIM (Subscriber Identity Module) card and a business SIM card and places both SIM cards in the same terminal, or the user has two private SIM cards and can choose which SIM card to use depending on the business.

The plurality of SIM cards included in a multi-card terminal may be from the same operator or from different operators. At present, the handling of the multi-card terminal is mainly based on the implementation of individual terminal manufacturers, and there is no unified standard and provision, which leads to many different terminal behaviours and handling manners. This may cause that when a multi-card terminal is performing service communication on one system, if a paging message is received through another system, it needs to decide whether needs to respond to the paging based on the user's configuration.

In addition, there are currently various configurations of transmitting and receiving antennas for the multi-card terminal and there are various supported frequency bands. Different multi-card terminals may support multi-card communication in different ways even if the number of transmitting and receiving antennas is the same. For example, there may be dual-card single standby, dual-card dual standby single pass, dual-card dual standby dual pass, etc.

SUMMARY

Embodiments of the present disclosure provide an information reporting method and apparatus, and storage medium.

According to a first aspect of embodiments of the present disclosure, there is provided an information reporting method, applied to a multi-card terminal and including:
  reporting capability information used for indicating a target terminal capability to a base station, wherein the target terminal capability is used for indicating a capability of the multi-card terminal to support a plurality of SIM cards operating simultaneously.
In an embodiment, the method further includes:
  receiving query information sent by the base station, wherein the query information is used for querying the target terminal capability of the multi-card terminal, wherein reporting capability information used for indicating a target terminal capability to a base station includes:
    reporting the capability information to the base station based on the query information.
In an embodiment, the target terminal capability is used to indicate at least one of:
  a capability of supporting the plurality of SIM cards operating simultaneously on a target frequency band, wherein the target frequency band is any one of operating frequency bands capable of being supported by the multi-card terminal or the base station;
  a capability of supporting the plurality of SIM cards operating simultaneously on a target frequency band combination, wherein the target frequency band combination is a combination between any plurality of mutually different frequency bands of the operating frequency bands capable of being supported by the multi-card terminal, or the target frequency band combination is a combination between any plurality of mutually different frequency bands of the operating frequency bands capable of being supported by the base station;
  a capability of supporting the plurality of SIM cards operating simultaneously when communicating on the target frequency band and using a target antenna configuration, wherein the target antenna configuration is an antenna configuration capable of being supported by the multi-card terminal or designated by the base station;
  a capability of supporting the plurality of SIM cards operating simultaneously when communicating on the target frequency band combination and using the target antenna configuration.
In an embodiment, reporting capability information used for indicating a target terminal capability to a base station includes:
  reporting the capability information to the base station through a first designated information unit in a first target RRC signaling.
In an embodiment, after reporting capability information used for indicating a target terminal capability to a base station, the method further includes:
  receiving target configuration information sent by the base station in case that the multi-card terminal does not have the target terminal capability, wherein the target configuration information is used to indicate configuration information when the multi-card terminal reports SIM card information corresponding to the plurality of SIM cards without having the target terminal capability;
  reporting the SIM card information to the base station based on the target configuration information without having the target terminal capability.
In an embodiment, the target configuration information is used to indicate at least one of:
  whether allowing the multi-card terminal to report the SIM card information;
  a SIM card identification for allowing to report the SIM card information;
  a cycle duration for reporting the SIM card information;
  a reporting condition for reporting the SIM card information;
  a content of the reported SIM card information;
  a reporting format for reporting the SIM card information.

According to a second aspect of embodiments of the present disclosure, there is provided an information reporting method, applied to a base station and including:
  configuring target configuration information for the multi-card terminal in response to determining that the multi-card terminal does not have the target terminal capability, wherein the target terminal capability is used for indicating a capability of the multi-card terminal to support a plurality of SIM cards operating simultaneously, the target configuration information is used to indicate configuration information when the multi-card terminal reports SIM card information corresponding to the plurality of SIM cards without having the target terminal capability; and sending the target configuration information to the multi-card terminal.

In an embodiment, determining that the multi-card terminal does not have the target terminal capability includes:

determining that capability information reported by the multi-card terminal for indicating the target terminal capability is not received.

In an embodiment, the method further includes:

sending query information to the multi-card terminal, wherein the query information is used to query the target terminal capability of the multi-card terminal.

In an embodiment, the target terminal capability is used to indicate at least one of:

a capability of supporting the plurality of SIM cards operating simultaneously on a target frequency band, wherein the target frequency band is any one of operating frequency bands capable of being supported by the multi-card terminal or the base station;

a capability of supporting the plurality of SIM cards operating simultaneously on a target frequency band combination, wherein the target frequency band combination is a combination between any plurality of mutually different frequency bands of the operating frequency bands capable of being supported by the multi-card terminal, or the target frequency band combination is a combination between any plurality of mutually different frequency bands of the operating frequency bands capable of being supported by the base station;

a capability of supporting the plurality of SIM cards operating simultaneously when communicating on the target frequency band and using a target antenna configuration, wherein the target antenna configuration is an antenna configuration capable of being supported by the multi-card terminal or designated by the base station;

a capability of supporting the plurality of SIM cards operating simultaneously when communicating on the target frequency band combination and using the target antenna configuration.

In an embodiment, sending the target configuration information to the multi-card terminal includes:

sending the target configuration information to the multi-card terminal through a second designated information unit of a second target signaling.

In an embodiment, the target configuration information is used to indicate at least one of:

whether allowing the multi-card terminal to report the SIM card information;

a SIM card identification for allowing to report the SIM card information;

a cycle duration for reporting the SIM card information;

a reporting condition for reporting the SIM card information;

a content of the reported SIM card information;

a reporting format for reporting the SIM card information.

According to a third aspect of embodiments of the present disclosure, there is provided an information reporting apparatus, applied to a multi-card terminal and including:

a reporting module, configured to report capability information used for indicating a target terminal capability to a base station, wherein the target terminal capability is used for indicating a capability of the multi-card terminal to support a plurality of SIM cards operating simultaneously.

In an embodiment, the apparatus further includes:

a first receiving module, configured to receive query information sent by the base station, wherein the query information is used for querying the target terminal capability of the multi-card terminal, wherein the reporting module includes:

a first reporting sub-module, configured to report the capability information to the base station based on the query information.

In an embodiment, the target terminal capability is used to indicate at least one of:

a capability of supporting the plurality of SIM cards operating simultaneously on a target frequency band, wherein the target frequency band is any one of operating frequency bands capable of being supported by the multi-card terminal or the base station;

a capability of supporting the plurality of SIM cards operating simultaneously on a target frequency band combination, wherein the target frequency band combination is a combination between any plurality of mutually different frequency bands of the operating frequency bands capable of being supported by the multi-card terminal, or the target frequency band combination is a combination between any plurality of mutually different frequency bands of the operating frequency bands capable of being supported by the base station;

a capability of supporting the plurality of SIM cards operating simultaneously when communicating on the target frequency band and using a target antenna configuration, wherein the target antenna configuration is an antenna configuration capable of being supported by the multi-card terminal or designated by the base station;

a capability of supporting the plurality of SIM cards operating simultaneously when communicating on the target frequency band combination and using the target antenna configuration.

In an embodiment, the reporting module includes:

a second reporting sub-module, configured to report the capability information to the base station through a first designated information unit in a first target RRC signaling.

In an embodiment, the apparatus further includes:

a second receiving module, configured to receive target configuration information sent by the base station in case that the multi-card terminal does not have the target terminal capability, wherein the target configuration information is used to indicate configuration information when the multi-card terminal reports SIM card information corresponding to the plurality of SIM cards without having the target terminal capability, wherein the SIM card information is reported to the base station based on the target configuration information without having the target terminal capability.

In an embodiment, the target configuration information is used to indicate at least one of:
  whether allowing the multi-card terminal to report the SIM card information;
  a SIM card identification for allowing to report the SIM card information;
  a cycle duration for reporting the SIM card information;
  a reporting condition for reporting the SIM card information;
  a content of the reported SIM card information;
  a reporting format for reporting the SIM card information.

According to a fourth aspect of embodiments of the present disclosure, there is provided an information reporting apparatus, applied to a base station and including:
  a configuration module, configured to configure target configuration information for the multi-card terminal in response to determining that the multi-card terminal does not have the target terminal capability, wherein the target terminal capability is used for indicating a capability of the multi-card terminal to support a plurality of SIM cards operating simultaneously, the target configuration information is used to indicate configuration information when the multi-card terminal reports SIM card information corresponding to the plurality of SIM cards without having the target terminal capability; and
  a first sending module, configured to send the target configuration information to the multi-card terminal.

In an embodiment, the apparatus further includes:
  a determination sub-module, configured to determine that capability information reported by the multi-card terminal for indicating the target terminal capability is not received.

In an embodiment, the apparatus further includes:
  a second sending module, configured to send query information to the multi-card terminal, wherein the query information is used to query the target terminal capability of the multi-card terminal.

In an embodiment, the target terminal capability is used to indicate at least one of:
  a capability of supporting the plurality of SIM cards operating simultaneously on a target frequency band, wherein the target frequency band is any one of operating frequency bands capable of being supported by the multi-card terminal or the base station;
  a capability of supporting the plurality of SIM cards operating simultaneously on a target frequency band combination, wherein the target frequency band combination is a combination between any plurality of mutually different frequency bands of the operating frequency bands capable of being supported by the multi-card terminal, or the target frequency band combination is a combination between any plurality of mutually different frequency bands of the operating frequency bands capable of being supported by the base station;
  a capability of supporting the plurality of SIM cards operating simultaneously when communicating on the target frequency band and using a target antenna configuration, wherein the target antenna configuration is an antenna configuration capable of being supported by the multi-card terminal or designated by the base station;
  a capability of supporting the plurality of SIM cards operating simultaneously when communicating on the target frequency band combination and using the target antenna configuration.

In an embodiment, the first sending module includes:
  a sending sub-module, configured to send the configured target configuration information corresponding to the first terminal capability to the multi-card terminal through a second designated information unit of a second target signaling.

In an embodiment, the target configuration information is used to indicate at least one of:
  whether allowing the multi-card terminal to report the SIM card information;
  a SIM card identification for allowing to report the SIM card information;
  a cycle duration for reporting the SIM card information;
  a reporting condition for reporting the SIM card information;
  a content of the reported SIM card information;
  a reporting format for reporting the SIM card information.

According to a fifth aspect of embodiments of the present disclosure, there is provided a non-transitory computer readable storage medium, having a computer program stored thereon, wherein the computer program is used to perform the information reporting method according to any one of the first aspect.

According to a sixth aspect of embodiments of the present disclosure, there is provided a non-transitory computer readable storage medium, having a computer program stored thereon, wherein the computer program is used to perform the information reporting method according to any one of the second aspect.

According to a seventh aspect of embodiments of the present disclosure, there is provided an information reporting apparatus, including:
  a processor; and
  a memory for storing instructions executable by the processor,
  wherein the processor is configured to perform the information reporting method according to any one of the first aspect.

According to an eighth aspect of embodiments of the present disclosure, there is provided an information reporting apparatus, including:
  a processor; and
  a memory for storing instructions executable by the processor,
  wherein the processor is configured to perform the information reporting method according to any one of the second aspect.

It should be understood that the above general description and the following detailed description are only exemplary and explanatory and do not limit the present disclosure.

BRIEF DESCRIPTION OF THE DRAWINGS

The accompanying drawings herein are incorporated into and form part of the specification, illustrate embodiments in accordance with the present disclosure and are used in conjunction with the specification to explain the principles of the disclosure.

DETAILED DESCRIPTION

Figure 1:
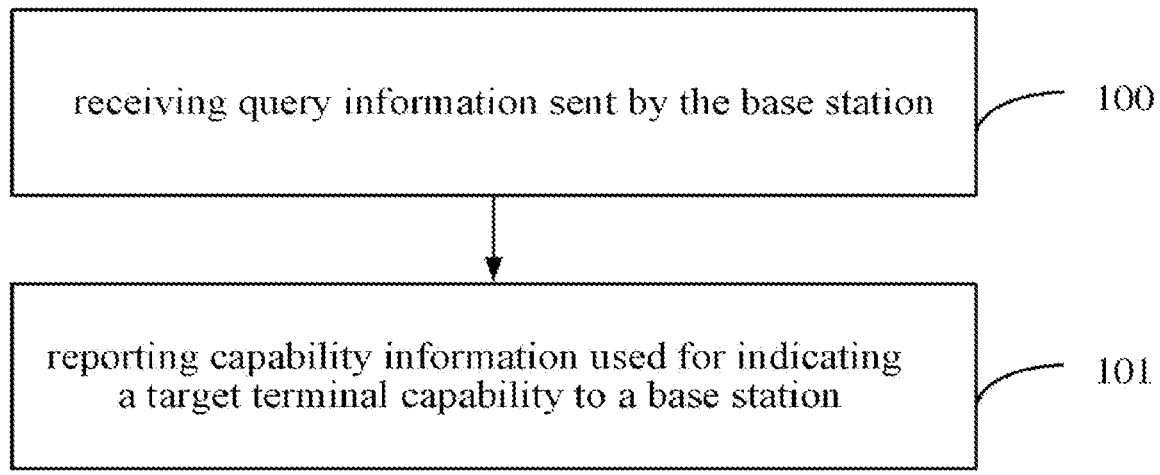
FIG. 1 is a flowchart of an information reporting method according to an example embodiment.

Example embodiments will be described herein in detail, examples of which are represented in the accompanying drawings. Where the following description relates to the accompanying drawings, the same numerals in the different accompanying drawings indicate the same or similar elements, unless otherwise indicated. The implementations described in the following example embodiments do not represent all implementations consistent with the present disclosure. Rather, they are only examples of apparatuses and methods that are consistent with some aspects of the present disclosure as detailed in the appended claims.

The terms used in this disclosure is for the purpose of describing particular embodiments only and is not intended to limit the present disclosure. The singular forms of "a", "said" and "the" as used in this disclosure and the appended claims are also intended to include plural forms, unless the context clearly indicates other meanings. It should also be understood that the term "and/or" as used herein refers to and encompasses any or all possible combinations of one or more of the associated listed items.

It should be understood that while the terms first, second, third, etc. may be used in this disclosure to describe various information, such information should not be limited to these terms. These terms are used only to distinguish information of the same type from one another. For example, without departing from the scope of the present disclosure, first information may also be referred to as second information, and similarly, second information may also be referred to as first information. Depending on the context, for example, the word "if" as used here may be interpreted as "at . . . " or "when . . . " or "in response to determining".

The information reporting scheme provided by the present disclosure is described below from the multi-card terminal side. A multi-card terminal is a terminal that supports the installation of two or more SIM (Subscriber Identity Module) cards. The SIM card may refer to a physical SIM card, or it may refer to a virtual card that can be used to implement SIM card functions, or it may also be a module integrated in the terminal to implement SIM card functions, etc. The present disclosure is not limited to this.

Embodiments of the present disclosure provide an information reporting method, which can be applied to a multi-card terminal. The method may include the following steps.

In step 101, capability information used for indicating a target terminal capability is reported to a base station.

In the embodiment, the target terminal capability is used for indicating a capability of the multi-card terminal to support a plurality of SIM cards operating simultaneously, the base station may be a base station to which any of the SIM cards included in the multi-card terminal is connected.

In the above embodiment, the multi-card terminal may report the target terminal capability to the base station, and the base station side may subsequently configure the target configuration information for the multi-card terminal when determining that the multi-card terminal does not have the target terminal capability, so as to allow the multi-card terminal to perform SIM card information reporting of the plurality of SIM cards, and thus the communication problem of the multi-card terminal in the case where the multi-card terminal does not have the target terminal capability can be solved.

In one example, the multi-card terminal may actively report this capability information to the base station.

In another example, the multi-card terminal may also report the capability information when the base station queries the target terminal capability.

Referring to FIG. 1, FIG. 1 is a flowchart of an information reporting method according to an embodiment. The method may further include following steps.

In step 100, query information sent from the base station is received.

The query information is used to query the target terminal capability of the multi-card terminal.

Correspondingly, the step 101 may include:
reporting the capability information to the base station based on the query information.

In the above embodiment, the multi-card terminal may actively report capability information to the base station, or the multi-card terminal may report capability information to the base station after receiving the query information sent by the base station. The implementation manners are various and the availability is high.

In an embodiment, the above target terminal capability may be used to indicate at least one of: a capability of supporting the plurality of SIM cards operating simultaneously on a target frequency band; a capability of supporting the plurality of SIM cards operating simultaneously on a target frequency band combination; a capability of supporting the plurality of SIM cards operating simultaneously when communicating on the target frequency band and using a target antenna configuration; a capability of supporting the plurality of SIM cards operating simultaneously when communicating on the target frequency band combination and using the target antenna configuration.

In an embodiment of the present disclosure, in a case where the target terminal capability is used to indicate a capability of supporting the plurality of SIM cards operating simultaneously on a target frequency band, the target frequency band may be any one of operating frequency bands capable of being supported by the multi-card terminal or the base station.

In one example, when the multi-card terminal actively reports capability information or the multi-card terminal reports capability information based on the query information, the target frequency band may be any one of the operating frequency bands that may be supported by the multi-card terminal.

In another example, considering that, in general, the number of operating frequency bands that the base station can support is less than the number of operating frequency bands that the terminal can support, the base station may carry operating frequency bands supported by itself in the query information. Correspondingly, when a multi-card terminal receives the query information and reports capability information based on the query information, the target frequency band may be any of the operating frequency bands that may be supported by the base station, thereby reducing the signaling resources occupied by the multi-card terminal when reporting capability information. For example, the operating frequency bands that the multi-card terminal can support include frequency band 1, frequency band 2, frequency band 3, frequency band 4 and frequency band 5. When the multi-card terminal actively reports capability information, it can report the capability of the plurality of SIM cards operating simultaneously supported by itself under frequency band 1, frequency band 2, frequency band 3, frequency band 4 and frequency band 5 respectively. If the multi-card terminal receives query information from the base station, the query information includes the operating frequency bands that the base station can support, the operating frequency bands supported by the base station include frequency band 1, frequency band 2 and frequency band 5, then the multi-card terminal may report the capability of the plurality of SIM cards operating simultaneously supported under frequency band 1, frequency band 2 and frequency band 5, respectively, when reporting the capability information.

In the embodiment of the present disclosure, in the case where the target terminal capability is used to indicate a capability of supporting the plurality of SIM cards operating simultaneously on a target frequency band combination, the target frequency band combination may be a combination between any plurality of mutually different frequency bands of the operating frequency bands capable of being supported by the multi-card terminal, or the target frequency band combination is a combination between any plurality of mutually different frequency bands of the operating frequency bands capable of being supported by the base station.

In one example, when the multi-card terminal actively reports capability information or the multi-card terminal reports capability information based on the query information, the target frequency band combination may be a combination between any plurality of mutually different frequency bands of the operating frequency bands capable of being supported by the multi-card terminal.

For example, if the operating frequency bands that the multi-card terminal can support include frequency band 1, frequency band 2 and frequency band 3, and the multi-card terminal includes two SIM cards, then the target frequency band combination may be the frequency band combination of between frequency band 1 and frequency band 2, or the target frequency band combination may be the frequency band combination between frequency band 2 and frequency band 3, and may also be the frequency band combination between frequency band 1 and frequency band 3.

In another example, when the multi-card terminal reports capability information based on the query information sent by the base station, the target frequency band combination may be a combination between any plurality of mutually different frequency bands of the operating frequency bands capable of being supported by the base station, thereby saving signaling resources when the multi-card terminal reports capability information.

In an embodiment of the present disclosure, in the case where the target terminal capability is used to indicate a capability of supporting the plurality of SIM cards operating simultaneously when communicating on the target frequency band and using a target antenna configuration, the target antenna configuration may be an antenna configuration capable of being supported by the multi-card terminal or designated by the base station. In an embodiment, in an embodiment of the present disclosure, the target antenna configuration may include, but is not limited to, a plurality of transmitting antenna combinations, i.e. all being combinations of transmitting antennas, or the target antenna configuration may also include a plurality of receiving antenna combinations, i.e. all being combinations of receiving antennas, or the target antenna configuration may also include a combination between any number of transmitting antennas and any number of receiving antennas.

For example, a multi-card terminal includes two transmitting antennas and two receiving antennas, the target antenna configuration may include two transmitting antennas, or include two receiving antennas, or include any combination of one transmitting antenna and two receiving antennas, one transmitting antenna and one receiving antenna, two transmitting antennas and one receiving antenna, two transmitting antennas and two receiving antennas.

In another example, when the multi-card terminal reports the target terminal capability based on the query information, the target antenna configuration may be the antenna configuration designated by the base station through the query information. The target antenna configuration may also include, but is not limited to, a plurality of transmitting antenna combinations, i.e. all being combinations of transmitting antennas, or the target antenna configuration may also include a plurality of receiving antenna combinations, i.e. all being combinations of receiving antennas, or the target antenna configuration may also include a combination between any number of transmitting antennas and any number of receiving antennas.

In an embodiment of the present disclosure, as for the case where the target terminal capability is used to indicate a capability of supporting the plurality of SIM cards operating simultaneously when communicating on the target frequency band combination and using the target antenna configuration, it is similar to the target terminal capability of supporting the plurality of SIM cards operating simultaneously when communicating on the target frequency band and using the target antenna configuration described above, which is not repeated herein.

In the above embodiments, the multi-card terminal can communicate based on different frequency bands, combinations of frequency bands, and can use different antenna configurations, to report the capability information used to indicate the target terminal capability to the base station, the availability is high.

In an embodiment, the above step 101 may include:
reporting the capability information to the base station through a first designated information unit in a first target RRC signaling.

In an embodiment, if 4G communication is supported between the multi-card terminal and the base station, the first target RRC (Radio Resource Control) signaling may include, but is not limited to, UE-EUTRA-Capability (Terminal Evolved UMTS Terrestrial Radio Access Capability) signaling, and the first designated information unit may include, but is not limited to, the OtherParameters information unit in the UE-EUTRA-Capability signaling.

If 5G communication is supported between the multi-card terminal and the base station, the first target RRC signaling may include, but is not limited to, UE-NR-Capability (Terminal New Air Port Capability) signaling, and the first designated information unit may include, but is not limited to, the RF-Parameters (Radio Frequency Parameters) information unit and/or the RF-ParametersMRDC (Radio Frequency Parameters for Multiple Radio Access Technologies Dual Connection) information unit in UE-NR-Capability signaling.

In the above-mentioned embodiments, the multi-card terminal can use the corresponding RRC signaling to report capability information, the implementation is easy and the availability is high. In addition, adopting the existing RRC signaling to report the capability information saves signaling resources.

Figure 2:
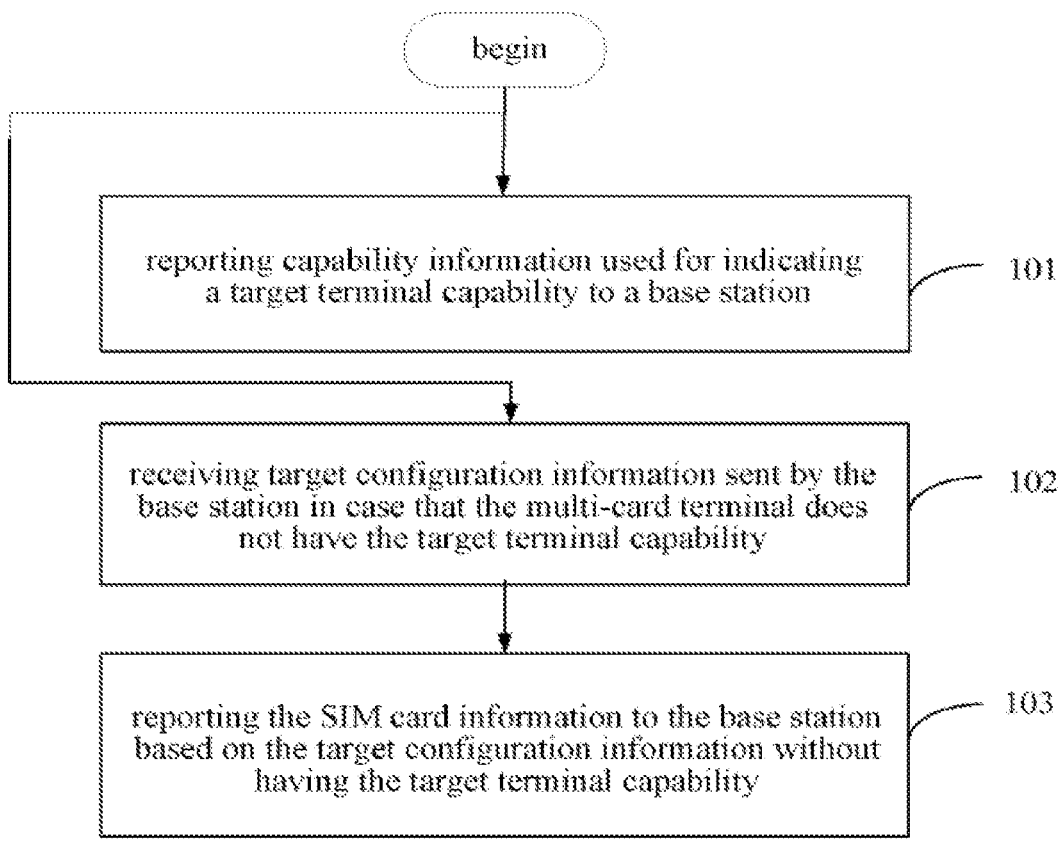
FIG. 2 is another flowchart of an information reporting method according to an example embodiment.

In an embodiment, with reference to FIG. 2, FIG. 2 shows a flowchart of an information reporting method according to an embodiment. After performing step 101, the method may further include:

step 102, receiving target configuration information sent by the base station in case that the multi-card terminal does not have the target terminal capability, wherein the target configuration information is used to indicate configuration information when the multi-card terminal reports SIM card information corresponding to the plurality of SIM cards without having the target terminal capability;

step 103, reporting the SIM card information to the base station based on the target configuration information without having the target terminal capability.

In an embodiment of the present disclosure, if a multi-card terminal has the target terminal capability, it means that the terminal supports the plurality of SIM cards to communicate simultaneously, and the base station can treat different SIM cards as a separate device for communication, so the base station does not need to configure the target configuration information for the multi-card terminal in this case.

If the multi-card terminal does not have the target terminal capability, it means that the terminal only supports one SIM card for communication at a certain point or time, and the base station needs to configure the target configuration information for the multi-card terminal, so that the multi-card terminal can report SIM card information based on the target configuration information without having the target terminal capability.

In an embodiment, the target configuration information is used to indicate at least one of: whether allowing the multi-card terminal to report the SIM card information; a SIM card identification for allowing to report the SIM card information; a cycle duration for reporting the SIM card information; a reporting condition for reporting the SIM card information; a content of the reported SIM card information; a reporting format for reporting the SIM card information.

In one example, the multi-card terminal determines, based on the target configuration information, that reporting of SIM card information is allowed under the first terminal capability, at this time, the multi-card terminal can report the SIM card information to the base station under the first terminal capability.

In another example, the multi-card terminal needs to report the SIM card information through the target SIM card corresponding to the SIM card identification.

In another example, the multi-card terminal may set a blocking timer which has a duration equal to the duration of the cycle included in the target configuration information. The blocking timer is activated every time the SIM card information is reported by the multi-card terminal, and the SIM card information can be reported again after the timer has expired.

In another example, the reporting condition includes, but is not limited to, the SIM card status condition when reporting the SIM card, for example, a SIM card needs to report the SIM card information when it is switched on. Alternatively, a SIM card may only report the SIM card information when it is in an off state, or a SIM card may report the SIM card information when it is in either state, without limiting the present disclosure.

In another example, the content of the reported SIM card information includes, but is not limited to, the number of the plurality of SIM cards, the identification information and/or temporary identification information of each SIM card, and/or whether the reporting of SIM card information by the multi-card terminal according to the target configuration will cause problems of being incapable of reporting, etc.

In another example, the reporting format includes, but is not limited to, the order in which contents of the reported SIM card information are reported, for example, reporting a certain content first and then reporting other contents, etc.

In the above embodiments, the multi-card terminal, after receiving the target configuration information sent by the base station, can report the SIM card information to the base station based on the target configuration information without having the target terminal capability. It solves the communication problem of the multi-card terminal in the case where the multi-card terminal does not have the target terminal capability, the availability is high.

The information reporting scheme provided by the present disclosure is further described below from the base station side. The base station can be a base station accessed by any SIM card of the multi-card terminal.

Figure 3:
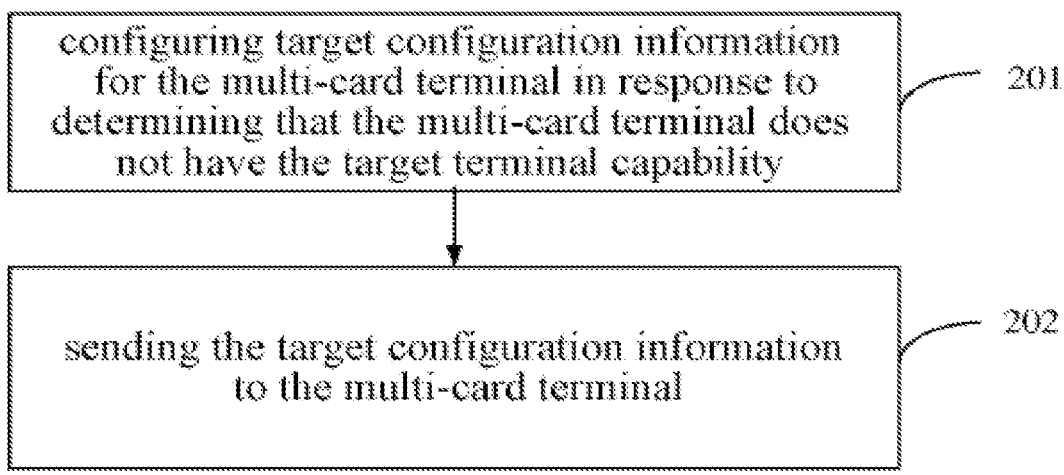
FIG. 3 is another flowchart of an information reporting method according to an example embodiment.

The present disclosure provides another information reporting method, shown in FIG. 3, which is a flowchart of another information reporting method according to an embodiment, which can be applied to a base station and include following steps.

In step 201, target configuration information is configured for the multi-card terminal in response to determining that the multi-card terminal does not have the target terminal capability.

The target terminal capability is used for indicating a capability of the multi-card terminal to support a plurality of SIM cards operating simultaneously, the target configuration information is used to indicate configuration information when the multi-card terminal reports SIM card information corresponding to the plurality of SIM cards without having the target terminal capability.

The target configuration information is used to indicate at least one of: whether allowing the multi-card terminal to report the SIM card information; a SIM card identification for allowing to report the SIM card information; a cycle duration for reporting the SIM card information; a reporting condition for reporting the SIM card information; a content of the reported SIM card information; a reporting format for reporting the SIM card information.

In step 202, the target configuration information is sent to the multi-card terminal.

In the above embodiment, the base station can configure the target configuration information for the multi-card terminal when it is determined that the multi-card terminal does not have the target terminal capability, thus it can solve the communication problem of the multi-card terminal when it does not support the target terminal capability.

In an embodiment, with respect to step 201, in an example, the base station may determine that the multi-card terminal does not support the target terminal capability when determining that the capability information actively reported by the multi-card terminal is not received. In an embodiment, the base station may determine that the multi-card terminal does not support the target terminal capability if the base station does not receive the capability information actively reported by the multi-card terminal within a specified time period, the specified time period may include, but is not limited to, a predetermined time period after the multi-card terminal is connected to the base station.

Figure 4:
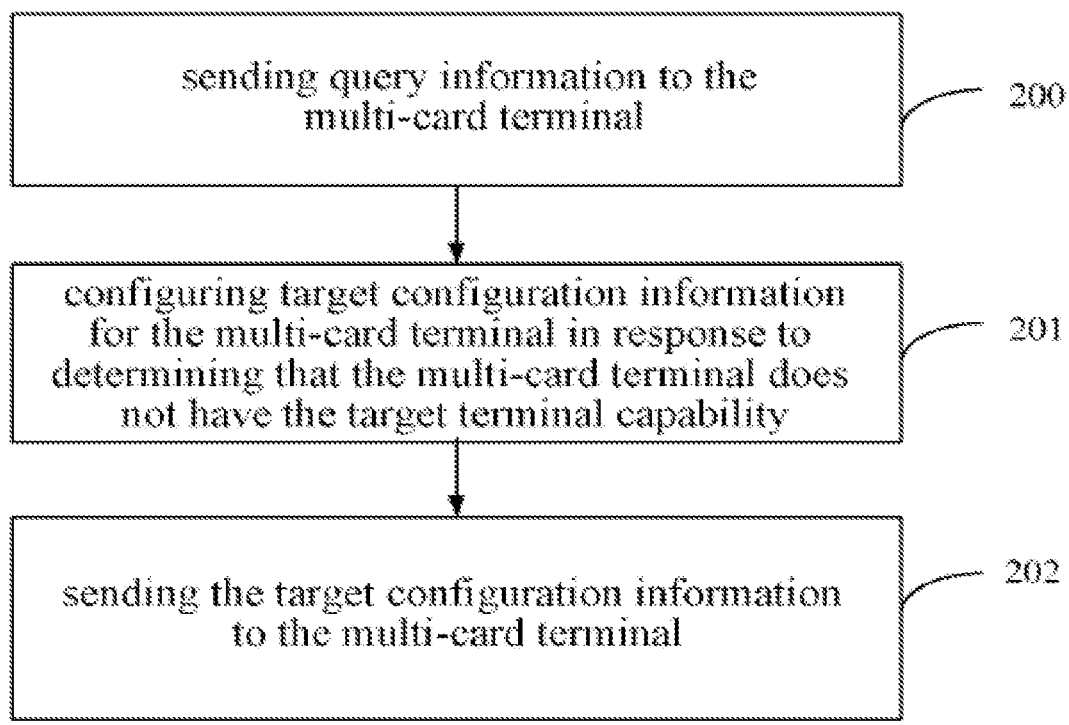
FIG. 4 is another flowchart of an information reporting method according to an example embodiment.

In another example, referring to FIG. 4, which is a flowchart of another information reporting method illustrated according to the embodiment shown in FIG. 3. The above method may further include:

step 200, sending the target configuration information to the multi-card terminal.

In this embodiment of the disclosure, the query information is used for querying the target terminal capability of the multi-card terminal. In an embodiment, the query information may include the operating frequency bands that the base station can support, or a combination of operating frequency bands or an antenna configuration designated by the base station. The multi-card terminal may report the capability information based on the query information. The target antenna configuration may include, but is not limited to, a plurality of transmitting antenna combinations, i.e. all being combinations of transmitting antennas, or the target antenna configuration may also include a plurality of receiving antenna combinations, i.e. all being combinations of receiving antennas, or the target antenna configuration may also include a combination between any number of transmitting antennas and any number of receiving antennas.

After sending the query information to the multi-card terminal, the base station may activate a timer. If still no capability information sent from the multi-card terminal is received when the timer expires, it may determine that the multi-card terminal does not have the target terminal capability.

In an embodiment, the above target terminal capability may be used to indicate at least one of: a capability of supporting the plurality of SIM cards operating simultaneously on a target frequency band; a capability of supporting the plurality of SIM cards operating simultaneously on a target frequency band combination; a capability of supporting the plurality of SIM cards operating simultaneously when communicating on the target frequency band and using a target antenna configuration; a capability of supporting the plurality of SIM cards operating simultaneously when communicating on the target frequency band combination and using the target antenna configuration.

In an embodiment, as for step 202, the base station may send the configured target configuration information to the multi-card terminal through a second designated information unit of a second target signaling.

If 4G communication is supported between the multi-card terminal and the base station, the second target RRC signaling may include, but is not limited to, the RRCConnectionReconfiguration (Radio Resource Control Connection Reconfiguration) signaling, and the second designated information unit may include, but is not limited to, the OtherConfig (Other Configuration) information unit in the RRCConnectionReconfiguration signaling.

If 4G communication is supported between the multi-card terminal and the base station, the second target RRC signaling may include, but is not limited to, the RRCReconfiguration (Radio Resource Control Reconfiguration) signaling, and the second designated information unit may include, but is not limited to, the OtherConfig information unit in the RRCReconfiguration signaling.

Figure 5:
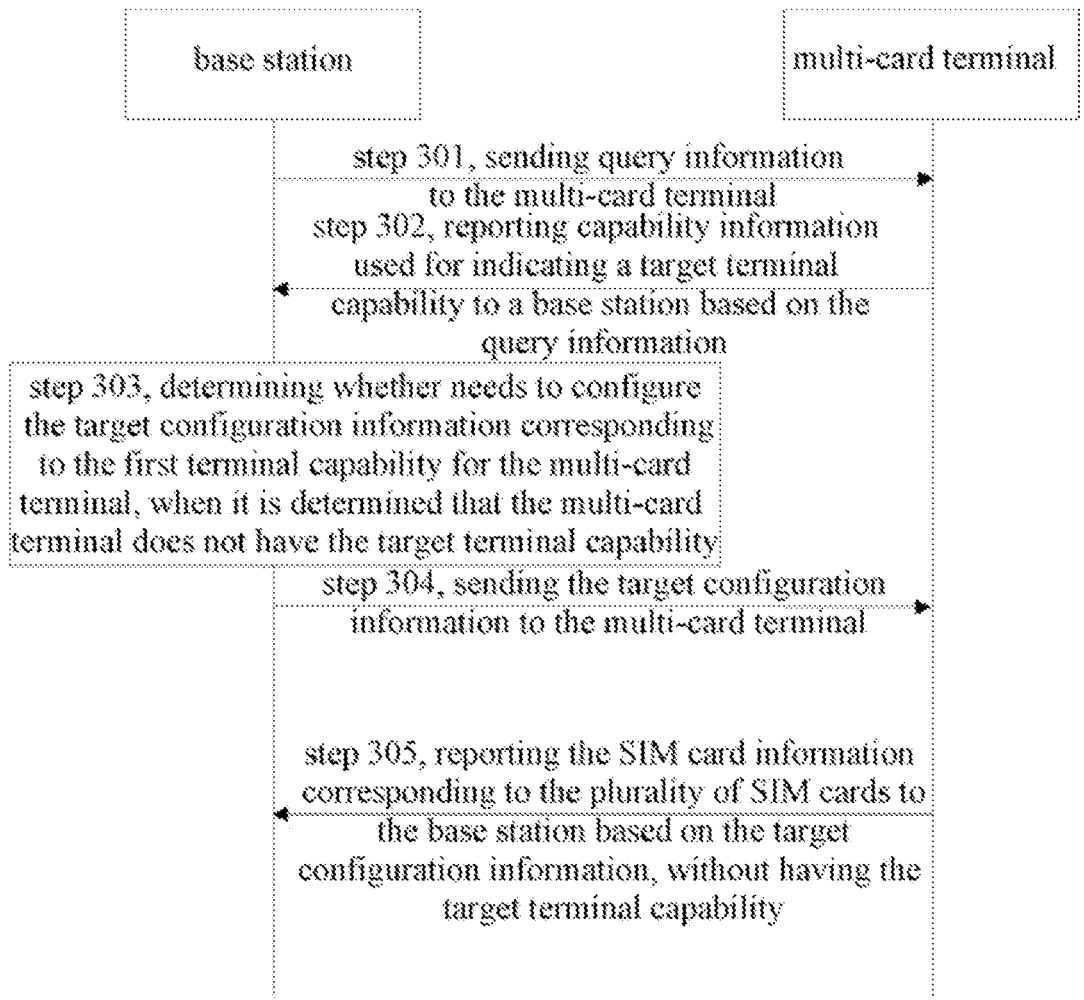
FIG. 5 is another flowchart of an information reporting method according to an example embodiment.

In the above embodiment, in the case that it is determined that the multi-card terminal does not have the target terminal capability, the base station can configure target configuration information for the multi-card terminal, and send the configured target configuration information corresponding to the first terminal capability to the multi-card terminal, thereby solving the communication problem of the multi-card terminal when the multi-card terminal does not have the target terminal capability, the availability is high In an embodiment, referring to FIG. 5, which shows a flowchart of an information reporting method according to an embodiment. The method may include following steps.

In step 301, the base station sends query information to the multi-card terminal.

The query information is used for querying the target terminal capability of the multi-card terminal.

If the multi-card terminal has the target terminal capability, step 302 is executed, otherwise steps 303 to 306 are executed.

In step 302, the multi-card terminal reports capability information for indicating the target terminal capability to the base station, based on the query information. The target terminal capability is used to indicate at least one of: a capability of supporting the plurality of SIM cards operating simultaneously on a target frequency band; a capability of supporting the plurality of SIM cards operating simultaneously on a target frequency band combination; a capability of supporting the plurality of SIM cards operating simultaneously when communicating on the target frequency band and using a target antenna configuration; a capability of supporting the plurality of SIM cards operating simultaneously when communicating on the target frequency band combination and using the target antenna configuration.

If the target configuration information is not received by the multi-card terminal, normal operation is performed (not shown in FIG. 5).

In step 303, the base station configures the target configuration information for the multi-card terminal when it is determined that the multi-card terminal does not have the target terminal capability.

In step 304, the base station sends the target configuration information to the multi-card terminal.

In step 305, the multi-card terminal reports the SIM card information corresponding to the plurality of SIM cards to the base station based on the target configuration information when the multi-card terminal does not have the target terminal capability.

If the multi-card terminal does not receive the target configuration information, normal operation is performed under the first terminal capability (not shown in FIG. 5).

In the above embodiment, the purpose of configuring target configuration information for a multi-card terminal to perform SIM card information reporting of the plurality of SIM cards in the case where the multi-card terminal does not have the target terminal capability is achieved, so that the communication problem of the multi-card terminal in the case where the multi-card terminal does not have the target terminal capability can be solved.

Corresponding to the aforementioned embodiments of the application function implementation method, the present disclosure also provides an embodiment of the application function implementation apparatus.

Figure 6:
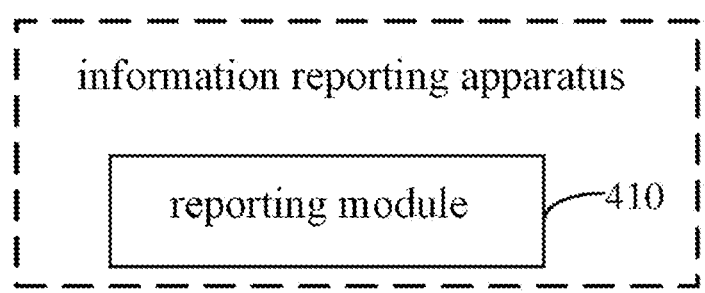
FIG. 6 is a block diagram of an information reporting apparatus according to an example embodiment.

Referring to FIG. 6, which is a block diagram of an information reporting apparatus illustrated according to an example embodiment. The apparatus is applied to a multi-card terminal and includes:

a reporting module 410, configured to report capability information used for indicating a target terminal capability to a base station, wherein the target terminal capability is used for indicating a capability of the multi-card terminal to support a plurality of SIM cards operating simultaneously.

In an embodiment, the apparatus further includes:
a first receiving module, configured to receive query information sent by the base station, wherein the query information is used for querying the target terminal capability of the multi-card terminal,
wherein the reporting module includes:
a first reporting sub-module, configured to report the capability information to the base station based on the query information.

In an embodiment, the target terminal capability is used to indicate at least one of:
a capability of supporting the plurality of SIM cards operating simultaneously on a target frequency band, wherein the target frequency band is any one of operating frequency bands capable of being supported by the multi-card terminal or the base station;
a capability of supporting the plurality of SIM cards operating simultaneously on a target frequency band combination, wherein the target frequency band combination is a combination between any plurality of mutually different frequency bands of the operating frequency bands capable of being supported by the multi-card terminal, or the target frequency band combination is a combination between any plurality of mutually different frequency bands of the operating frequency bands capable of being supported by the base station;
a capability of supporting the plurality of SIM cards operating simultaneously when communicating on the target frequency band and using a target antenna configuration, wherein the target antenna configuration is an antenna configuration capable of being supported by the multi-card terminal or designated by the base station;
a capability of supporting the plurality of SIM cards operating simultaneously when communicating on the target frequency band combination and using the target antenna configuration.

In an embodiment, the reporting module includes:
a second reporting sub-module, configured to report the capability information to the base station through a first designated information unit in a first target RRC signaling.

In an embodiment, the apparatus further includes:
a second receiving module, configured to receive target configuration information sent by the base station in case that the multi-card terminal does not have the target terminal capability, wherein the target configuration information is used to indicate configuration information when the multi-card terminal reports SIM card information corresponding to the plurality of SIM cards without having the target terminal capability,
wherein the SIM card information is reported to the base station based on the target configuration information without having the target terminal capability.

In an embodiment, the target configuration information is used to indicate at least one of:
whether allowing the multi-card terminal to report the SIM card information; a SIM card identification for allowing to report the SIM card information;
a cycle duration for reporting the SIM card information;
a reporting condition for reporting the SIM card information;
a content of the reported SIM card information;
a reporting format for reporting the SIM card information.

Figure 7:
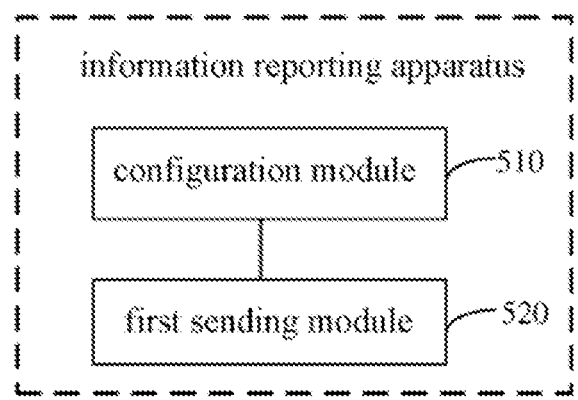
FIG. 7 is another block diagram of an information reporting apparatus according to an example embodiment.

Referring to FIG. 7, FIG. 7 is a block diagram of another information reporting apparatus illustrated according to an example embodiment. The apparatus is applied to a base station and includes:
a configuration module 510, configured to configure target configuration information for the multi-card terminal in response to determining that the multi-card terminal does not have the target terminal capability, wherein the target terminal capability is used for indicating a capability of the multi-card terminal to support a plurality of SIM cards operating simultaneously, the target configuration information is used to indicate configuration information when the multi-card terminal reports SIM card information corresponding to the plurality of SIM cards without having the target terminal capability; and
a first sending module 520, configured to send the target configuration information to the multi-card terminal.

In an embodiment, the apparatus further includes:
a determination sub-module, configured to determine that capability information reported by the multi-card terminal for indicating the target terminal capability is not received.

In an embodiment, the apparatus further includes:
a second sending module, configured to send query information to the multi-card terminal, wherein the query information is used to query the target terminal capability of the multi-card terminal.

In an embodiment, the target terminal capability is used to indicate at least one of:
a capability of supporting the plurality of SIM cards operating simultaneously on a target frequency band, wherein the target frequency band is any one of operating frequency bands capable of being supported by the multi-card terminal or the base station;
a capability of supporting the plurality of SIM cards operating simultaneously on a target frequency band combination, wherein the target frequency band combination is a combination between any plurality of mutually different frequency bands of the operating frequency bands capable of being supported by the multi-card terminal, or the target frequency band combination is a combination between any plurality of mutually different frequency bands of the operating frequency bands capable of being supported by the base station;
a capability of supporting the plurality of SIM cards operating simultaneously when communicating on the target frequency band and using a target antenna configuration, wherein the target antenna configuration is an antenna configuration capable of being supported by the multi-card terminal or designated by the base station;
a capability of supporting the plurality of SIM cards operating simultaneously when communicating on the target frequency band combination and using the target antenna configuration.

In an embodiment, the first sending module includes:
a sending sub-module, configured to send the configured target configuration information corresponding to the first terminal capability to the multi-card terminal through a second designated information unit of a second target signaling.

In an embodiment, the target configuration information is used to indicate at least one of:
whether allowing the multi-card terminal to report the SIM card information;

a SIM card identification for allowing to report the SIM card information;
a cycle duration for reporting the SIM card information;
a reporting condition for reporting the SIM card information;
a content of the reported SIM card information;
a reporting format for reporting the SIM card information.

Since the apparatus embodiments basically correspond to the method embodiments, the relevant parts may refer to the description of the method embodiments. The apparatus embodiments described above are only schematic, where the units described above as separate components may or may not be physically separated, and the components displayed as units may or may not be physical units, i.e. they may be located in one place or may be distributed over several network units. Some or all of these modules may be selected according to practical needs to achieve the purpose of the solution of the present disclosure. It can be understood and implemented by a person of ordinary skill in the art without creative labor.

Correspondingly, the present disclosure also provides a computer readable storage medium, having a computer program stored thereon, wherein the computer program is used to perform any of information reporting methods at the multi-card terminal side.

Correspondingly, the present disclosure also provides a computer readable storage medium, having a computer program stored thereon, wherein the computer program is used to perform any of information reporting methods at the base station side.

Correspondingly, the present disclosure further provides an information reporting apparatus, including:
a processor; and
a memory for storing instructions executable by the processor,
wherein the processor is configured to perform any of information reporting methods at the multi-card terminal side.

The technical solutions provided by embodiments of the present disclosure may include the following beneficial effects.

In embodiments of the present disclosure, the target configuration information is configured by the base station for the multi-card terminal in the case where the multi-card terminal does not have the target terminal capability, so that the multi-card terminal can perform SIM card information reporting of the plurality of SIM cards based on the target configuration information in the case where the multi-card terminal does not have the target terminal capability, and thus the communication problem of the multi-card terminal in the case where the multi-card terminal does not have the target terminal capability can be solved.

Figure 8:
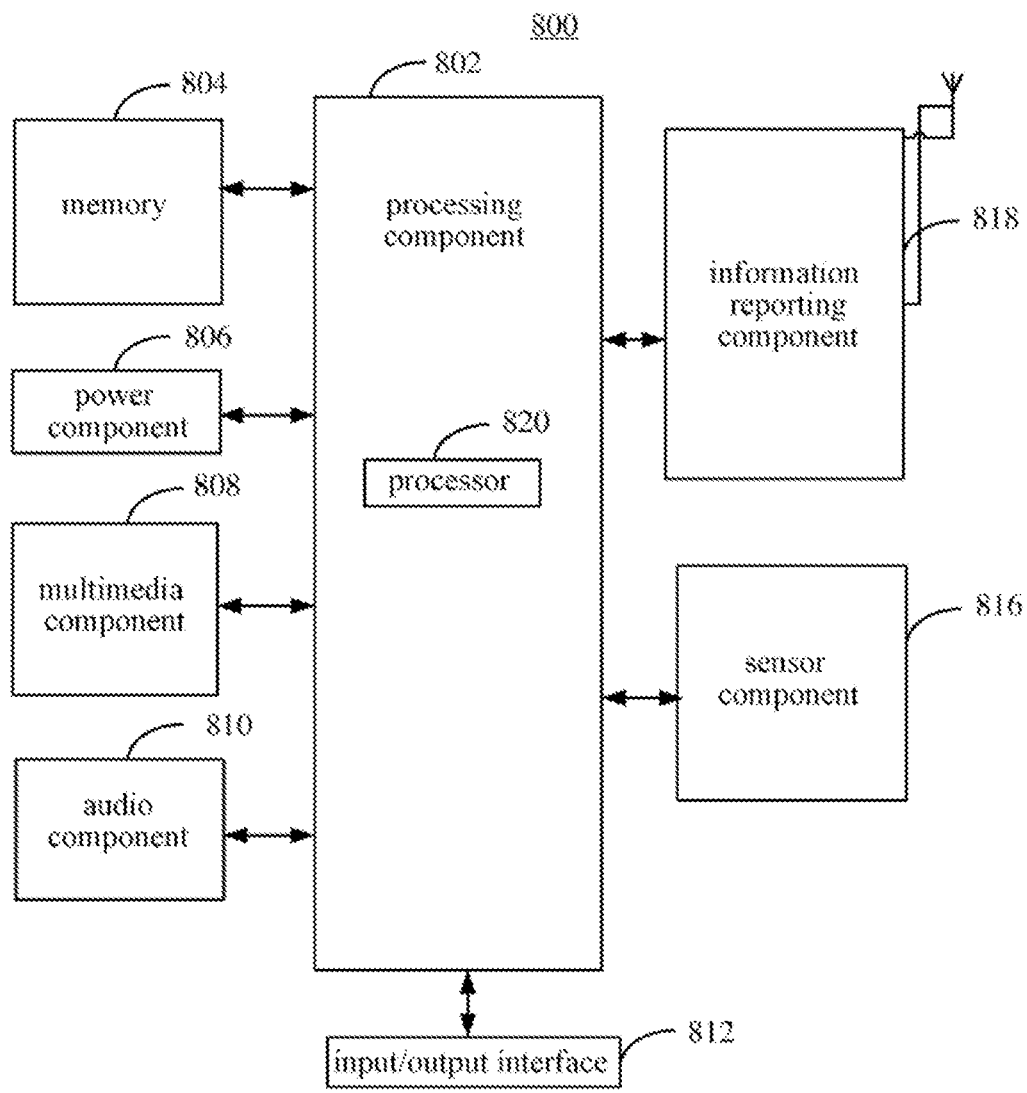
FIG. 8 is a schematic diagram of a structure of an information reporting apparatus according to an example embodiment of the present disclosure.

FIG. 8 is a block diagram of an electronic device 800 illustrated according to an example embodiment. For example, the electronic device 800 may be a multi-card terminal including multiple SIM cards, such as a mobile phone, a tablet, an e-book reader, a multimedia playback device, a wearable device, a vehicle terminal, an ipad, a smart TV, etc.

Referring to FIG. 8, the electronic device 800 may include one or more of the following components: a processing component 802, a memory 804, a power component 806, a multimedia component 808, an audio component 810, an input/output (I/O) interface 812, a sensor component 816, and an information reporting component 818.

The processing component 802 typically controls the overall operations of the electronic device 800, such as the operations associated with display, telephone calls, data communications, camera operations, and recording operations. The processing component 802 can include one or more processors 820 to execute instructions to perform all or part of the steps in the above information reporting methods. Moreover, the processing component 802 can include one or more modules to facilitate the interaction between the processing component 802 and other components. For example, the processing component 802 can include a multimedia module to facilitate the interaction between the multimedia component 808 and the processing component 802. As another example, processing component 802 may read executable instructions from the memory to implement the steps of an information reporting method provided in the above embodiments.

The memory 804 is configured to store various types of data to support the operation of the electronic device 800. Examples of such data include instructions for any application or method operated on the electronic device 800, such as the contact data, the phone book data, messages, pictures, videos, and the like. The memory 804 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the electronic device 800. The power component 806 can include a power management system, one or more power sources, and other components associated with the generation, management, and distribution of power in the electronic device 800.

The multimedia component 808 includes a screen providing an output interface between the electronic device 800 and the user. In some embodiments, the multimedia component 808 includes a front camera and/or a rear camera. When the electronic device 800 is in an operation mode, such as a photographing mode or a video mode, the front camera and/or the rear camera can receive external multimedia data. Each of the front camera and the rear camera may be a fixed optical lens system or have focus and optical zoom capability.

The audio component 810 is configured to output and/or input an audio signal. For example, the audio component 810 includes a microphone (MIC) configured to receive an external audio signal when the electronic device 800 is in an operation mode, such as a call mode, a recording mode, and a voice recognition mode. The microphone is configured to receive the external audio signal. The received audio signal may be further stored in the memory 804 or sent via the information reporting component 818. In some embodiments, the audio component 810 also includes a speaker for outputting the audio signal.

The I/O interface 812 provides an interface between the processing component 802 and peripheral interface modules, such as a keyboard, a click wheel, buttons, and the like. These buttons may include, but not limited to, a home button, a volume button, a starting button, and a locking button.

The sensor component 816 includes one or more sensors for providing state assessments of various aspects of the electronic device 800. For example, the sensor component 816 can detect an open/closed state of the electronic device 800, relative positioning of components, such as the display and the keypad of the electronic device 800. The sensor component 816 can also detect a change in position of one component of the electronic device 800 or the electronic device 800, the presence or absence of user contact with the electronic device 800, an orientation, or an acceleration/deceleration of the electronic device 800, and a change in temperature of the electronic device 800. The sensor component 816 can also include a proximity sensor configured to detect the presence of nearby objects without any physical contact. The sensor component 816 can also include a light sensor, such as a CMOS or CCD image sensor, configured to use in imaging applications. In some embodiments, the sensor component 816 can also include an accelerometer sensor, a gyroscope sensor, a magnetic sensor, a pressure sensor, or a temperature sensor.

The information reporting component 818 is configured to facilitate information reporting between the electronic device 800 and other devices by wired or wireless manners. The electronic device 800 can access a wireless network based on a an information reporting standard, such as Wi-Fi, 2G, 3G, 4G, 4G, 5G, 6G or a combination thereof. In an example embodiment, the information reporting component 818 receives broadcast signals or broadcast associated information from an external broadcast management system via a broadcast channel. In an example embodiment, the information reporting component 818 also includes a near field communication (NFC) module to facilitate short-range information reporting. For example, the NFC module can be implemented based on radio frequency identification (RFID) technology, infrared data association (IrDA) technology, ultra-wideband (UWB) technology, Bluetooth (BT) technology and other technologies.

In an example embodiment, the electronic device 800 may be implemented with one or more application specific integrated circuits (ASICs), digital signal processors (DSPs), digital signal processing devices (DSPDs), programmable logic devices (PLDs), field programmable Gate arrays (FPGAs), controllers, microcontrollers, microprocessors or other electronic components, to perform the information reporting methods described above.

In an example embodiment, there is also provided a non-transitory computer-readable storage medium including instructions, such as a memory 804 including instructions executable by the processor 820 of the electronic device 800 to perform the above information reporting methods. For example, the non-transitory computer readable storage medium may be a ROM, a random access memory (RAM), a CD-ROM, a magnetic tape, a floppy disc, and an optical data storage device, or the like.

Correspondingly, the present disclosure further provides an information reporting apparatus, including:
a processor; and
a memory for storing instructions executable by the processor,
wherein the processor is configured to perform any of information reporting methods at the base station side.

Figure 9:
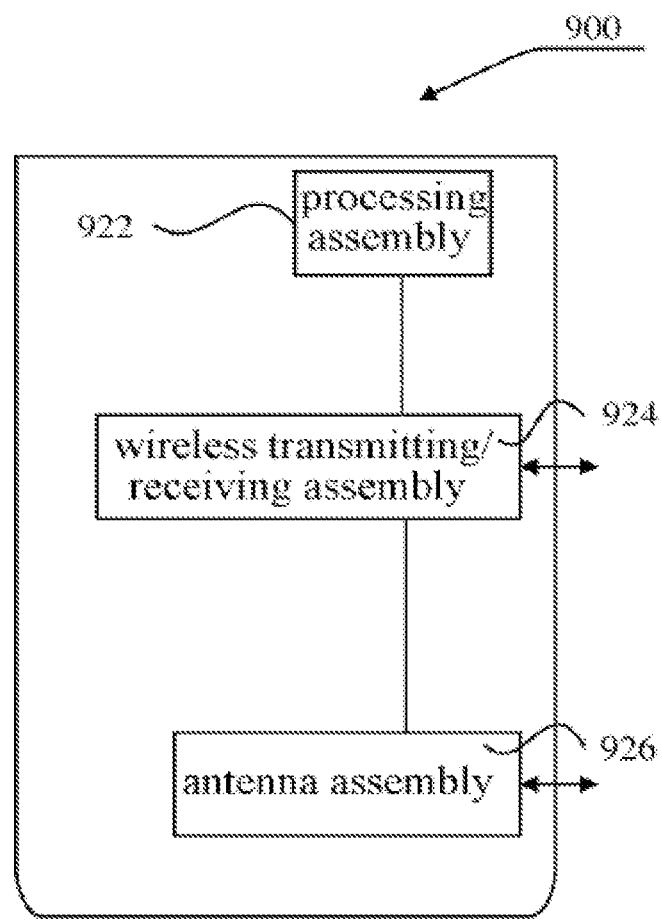
FIG. 9 is another schematic diagram of a structure of an information reporting apparatus according to an example embodiment of the present disclosure.

As shown in FIG. 9, FIG. 9 is a schematic diagram of a structure of another information reporting apparatus 900 illustrated according to an example embodiment. The apparatus 900 may be provided as a base station. Referring to FIG. 9, the apparatus 900 includes a processing assembly 922, a wireless transmitting/receiving assembly 924, an antenna assembly 926, and a signal processing portion specific to the wireless interface. The processing assembly 922 may further include one or more processors.

One of the processors of the processing assembly 922 may be configured to perform the any of information reporting methods at the base station side.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative only, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. An information reporting method, performed by a base station and comprising:
configuring target configuration information for the multi-card terminal in response to determining that the multi-card terminal does not have the target terminal capability, wherein the target terminal capability is used for indicating a capability of the multi-card terminal to support a plurality of SIM cards operating simultaneously, the target configuration information is used to indicate configuration information when the multi-card terminal reports SIM card information corresponding to the plurality of SIM cards without having the target terminal capability; and
sending the target configuration information to the multi-card terminal,
wherein the target terminal capability is used to indicate at least one of:
a capability of supporting the plurality of SIM cards operating simultaneously on a target frequency band combination, wherein the target frequency band combination is a combination between any plurality of mutually different frequency bands of the operating frequency bands capable of being supported by the multi-card terminal, or the target frequency band combination is a combination between any plurality of mutually different frequency bands of the operating frequency bands capable of being supported by the base station; or
a capability of supporting the plurality of SIM cards operating simultaneously when communicating on the target frequency band and using a target antenna configuration, wherein the target antenna configuration is an antenna configuration capable of being supported by the multi-card terminal or designated by the base station.

2. The method according to claim 1, wherein determining that the multi-card terminal does not have the target terminal capability comprises:
determining that capability information reported by the multi-card terminal for indicating the target terminal capability is not received.

3. The method according to claim 2, further comprising:
sending query information to the multi-card terminal, wherein the query information is used to query the target terminal capability of the multi-card terminal.

4. The method according to claim 1, wherein the target terminal capability is further used to indicate at least one of:

a capability of supporting the plurality of SIM cards operating simultaneously on a target frequency band, wherein the target frequency band is any one of operating frequency bands capable of being supported by the multi-card terminal or the base station; or a capability of supporting the plurality of SIM cards operating simultaneously when communicating on the target frequency band combination and using the target antenna configuration.

5. The method according to claim 1, wherein sending the target configuration information to the multi-card terminal comprises:

sending the target configuration information to the multi-card terminal through a second designated information unit of a second target signaling.

6. The method according to claim 1, wherein the target configuration information is used to indicate at least one of:

whether allowing the multi-card terminal to report the SIM card information;

a SIM card identification for allowing to report the SIM card information;

a cycle duration for reporting the SIM card information;

a reporting condition for reporting the SIM card information;

a content of the reported SIM card information; or a reporting format for reporting the SIM card information.

7. A base station, comprising:

a processor; and a memory for storing instructions executable by the processor, wherein the processor is configured to perform the configuring target configuration information for the multi-card terminal in response to determining that the multi-card terminal does not have the target terminal capability, wherein the target terminal capability is used for indicating a capability of the multi-card terminal to support a plurality of SIM cards operating simultaneously, the target configuration information is used to indicate configuration information when the multi-card terminal reports SIM card information corresponding to the plurality of SIM cards without having the target terminal capability; and sending the target configuration information to the multi-card terminal, wherein the target terminal capability is used to indicate at least one of:

a capability of supporting the plurality of SIM cards operating simultaneously on a target frequency band combination, wherein the target frequency band combination is a combination between any plurality of mutually different frequency bands of the operating frequency bands capable of being supported by the multi-card terminal, or the target frequency band combination is a combination between any plurality of mutually different frequency bands of the operating frequency bands capable of being supported by the base station; or a capability of supporting the plurality of SIM cards operating simultaneously when communicating on the target frequency band and using a target antenna configuration, wherein the target antenna configuration is an antenna configuration capable of being supported by the multi-card terminal or designated by the base station.

8. The apparatus-base station according to claim 7, wherein the processor is further configured to:

determine that capability information reported by the multi-card terminal for indicating the target terminal capability is not received.

9. The base station according to claim 8, wherein the processor is further configured to:

send query information to the multi-card terminal, wherein the query information is used to query the target terminal capability of the multi-card terminal.

10. A non-transitory computer readable storage medium, having a computer program stored thereon, wherein the computer program is used to cause a base station to perform an information reporting method comprising:

configuring target configuration information for the multi-card terminal in response to determining that the multi-card terminal does not have the target terminal capability, wherein the target terminal capability is used for indicating a capability of the multi-card terminal to support a plurality of SIM cards operating simultaneously, the target configuration information is used to indicate configuration information when the multi-card terminal reports SIM card information corresponding to the plurality of SIM cards without having the target terminal capability; and sending the target configuration information to the multi-card terminal, wherein the target terminal capability is used to indicate at least one of:

a capability of supporting the plurality of SIM cards operating simultaneously on a target frequency band combination, wherein the target frequency band combination is a combination between any plurality of mutually different frequency bands of the operating frequency bands capable of being supported by the multi-card terminal, or the target frequency band combination is a combination between any plurality of mutually different frequency bands of the operating frequency bands capable of being supported by the base station; or a capability of supporting the plurality of SIM cards operating simultaneously when communicating on the target frequency band and using a target antenna configuration, wherein the target antenna configuration is an antenna configuration capable of being supported by the multi-card terminal or designated by the base station.

* * * * *